Figure 1:
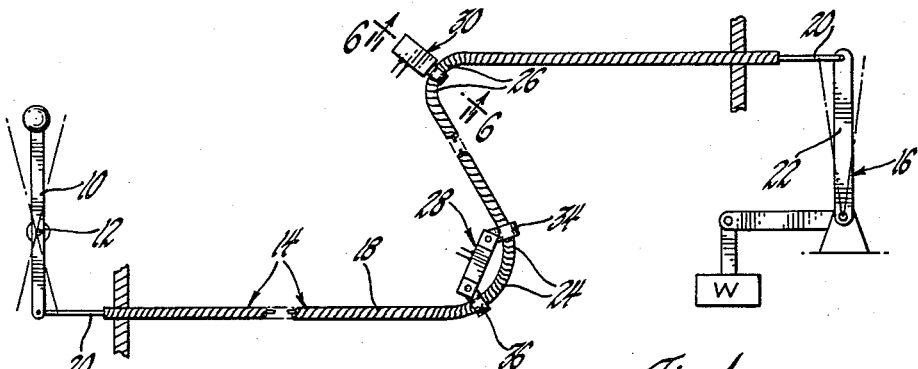

March 3, 1964    A. J. KOMPANEK ETAL    3,122,942
FRICTION REDUCING DEVICE FOR REMOTE CONTROL SYSTEM
Filed Nov. 1, 1961    2 Sheets-Sheet 1

INVENTORS
Andrew J. Kompanek
BY E. Allen S. Matz
Winnie & Barnard
ATTORNEYS

INVENTORS
Andrew J. Kompanek
BY G. Allen S. Matz
Winnie & Barnard
ATTORNEYS

United States Patent Office 3,122,942
Patented Mar. 3, 1964

3,122,942
FRICTION REDUCING DEVICE FOR REMOTE
CONTROL SYSTEM
Andrew J. Kompanek, Lansdale, and Allen S. Matz, Cornwells Heights, Pa., assignors to Teleflex Incorporated, North Wales, Pa., a corporation of Delaware
Filed Nov. 1, 1961, Ser. No. 149,305
7 Claims. (Cl. 74—501)

The present invention relates to a device for use with a conduit system which is adapted to significantly reduce, and in some instances for all practical purposes entirely eliminate, friction between a conduit casing and a cable member slidably disposed therein. More specifically, in those conduit systems in which there is sliding contact between a cable and a conduit the subject invention is adapted to induce a resonant vibration, normally through the conduit, in a manner which substantially reduces or eliminates frictionally induced loads in the conduit system.

In recent years there has developed an ever increasing number of mechanical control situations in which the operator is at one location and the device he is endeavoring to control is beyond his normal reach thereby requiring the use of a remote control system. Many illustrations of such remote control systems readily come to mind, outboard motor, various automotive, and most importantly, aircraft and missile controls. The foregoing are environments utilizing conduit-cable systems and where the present invention may be applied to advantage.

The subject vibration inducing device is applicable to remote control devices utilizing either rigid or flexible conduits within which a flexible control cable is adapted to be actuatably supported. The present invention is particularly intended to be used with conduit systems which include bends or convolutions between the input and output ends. It is apparent that frictional drag will vary in proportion to the area of contact between conduit and cable and the pressure with which the cable is forced into engagement with the conduit interior. Further, in passing through a conduit bend a component of longitudinal cable movement will urge the cable against the conduit wall in the bend area. This cable-actuating pressure forcing the cable radially against the conduit wall thereby adds to the normal frictional resistance between cable and conduit found in a straight lay of conduit considerably increasing the frictional drag to be overcome by the operator.

It is an object of the present invention to induce resonant vibrations particularly in the bend areas whereby the frictional loads induced by contact between the cable and the conduit are greatly diminished or eliminated. By thus selectively vibrating the conduit, the cable is moved radially away from the conduit with a periodicity that causes the cable to "float" within the conduit rather than drag over the conduit interior surface. In this manner the force necessary to initiate cable movement is greatly reduced. In other words, the cable "breakaway" load or force is greatly reduced.

The details as well as other objects and advantages of the present invention will be apparent from a perusal of the detailed description which follows taken in conjunction with the drawings.

Figure 2:
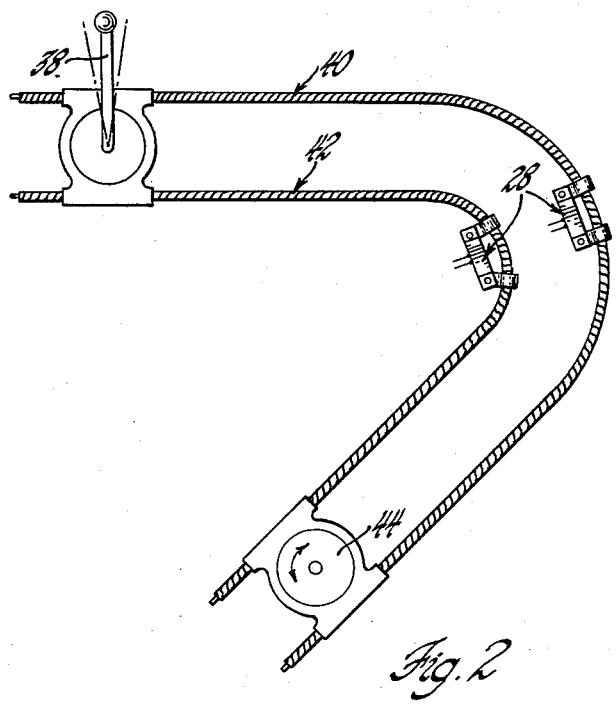
Figure 3:
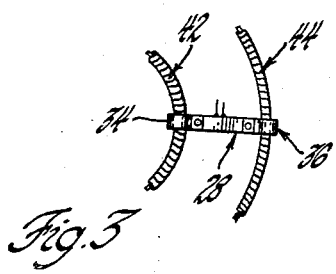
Figure 4:
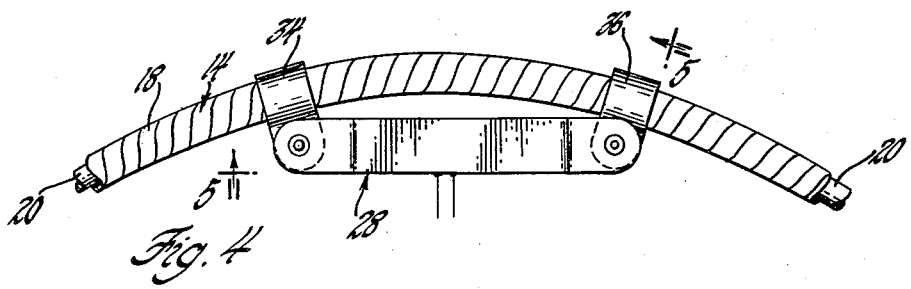
Figure 5:
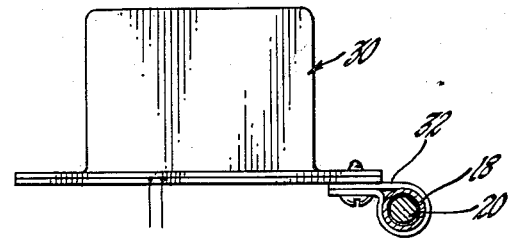
Figure 6:
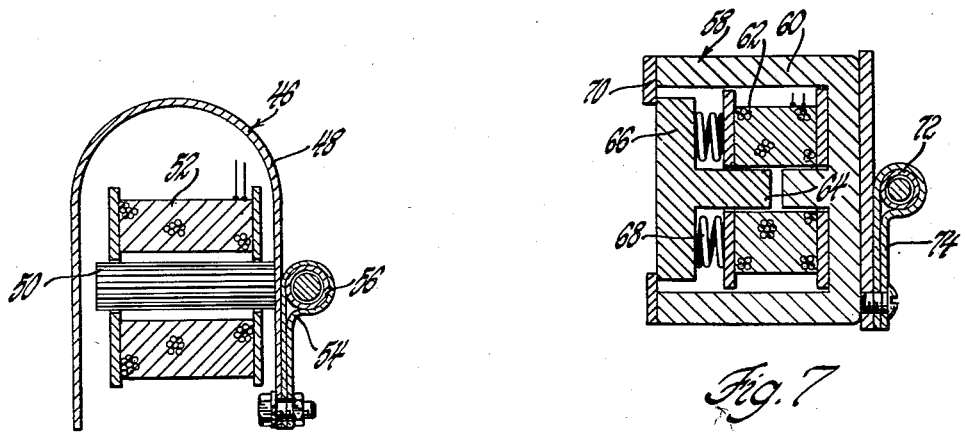
Figure 7:
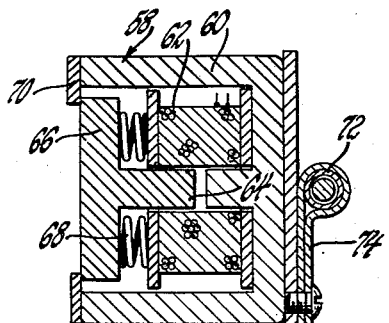

In the drawings:
FIGURE 1 discloses a single run conduit control system embodying the invention;
FIGURE 2 is a dual run conduit system embodying the invention;
FIGURE 3 is a modification showing a single vibrator connected to separate conduits;
FIGURES 4 and 5 are enlargements of two different ways in which vibrators may be connected to conduits;
FIGURES 6 and 7 are detailed views of two types of vibrators.

Typical remote control systems are shown in FIGURES 1, 2 and 3 illustrating various embodiments of the subject invention. Referring first to FIGURE 1, an operator controlled input lever 10 is pivotally mounted intermediate its ends to a fixed pivot 12 and is articulated at one end through a conduit assembly indicated generally at 14 to a loaded (w) output devices diagrammatically indicated at 16.

Conduit assembly 14 includes an outer casing or conduit member 18 within which a flexible wire or cable 20 is slidably disposed. Cable 20 is articulated at one end to input lever 10 and at its other end to output lever 22 of device 16.

While illustrated as being of the flexible type, it is to be understood that conduit 18 may also be of rigid or solid wall construction.

In this instance, conduit 18 is shown to have two bends 24 and 26 intermediate the input and output levers 10 and 22. Thus, to move the load W in one direction input lever 10 will be rotated about its pivot 12 to put the cable 20 under tension. Whereas to move the load in the opposite direction the cable will be placed under a compression loading. In either case, cable 20 will be caused to rub or drag against conduit casing 18 particularly at bends 24 and 26.

Before considering the subject invention further, it would be well to understand some of the factors to be considered in the operation of a remote control system utilizing a conduit and flexible cable as thus far described. One of the very important factors affecting such devices is the matter of backlash or lost motion. In other words, the meaning of backlash can perhaps be best understood by an example. Assuming no conduit flexure, when the operator actuates a lever such that the control cable at the input end goes through two inches of movement but only an inch and a half of cable movement is experienced at the output end, then a half inch of movement is lost in what is termed backlash or lost motion. In general, this "lost" movement is attributable to the clearance between the cable and the supporting or surrounding conduit. A certain amount of this lost motion could also be attributable to stretching or compressing of the cable itself.

The matter of backlash or lost motion is further aggravated in a conduit system which has a plurality of bends between its input and output ends. In each of such bends a certain amount of cable movement is lost as the cable is caused to move from one side of the interior of the conduit to the other through the various bends and which movement is lost in terms of the actual cable output movement.

In a pure tension or pure compression system, lost motion in the conduit is a function of cable stretch factor C, differential in average cable load P, and cable length L. If the load transmission efficiency is 100% (zero frictional drag or resistance between cable and conduit), a pre-loaded cable experiences no differential in average cable load when load direction is reversed. Therefore, the term P vanishes and the backlash or lost motion becomes zero. Backlash is related to the foregoing factors in accordance with the following formula:

$$Backlash = CPL$$

In a conduit system actuated by alternate tension and compression loads, backlash or lost motion is expressed as follows:

$$Backlash = CPL + YD$$

where:

C = combined tension and compression strain rates
P = average of tension and compression input and output loads
L = cable length
Y = translation factor in bends
D = degrees of bend in conduit Translation factor Y is defined as the additional backlash, that is, beyond the amount due to the clearance between the cable and the conduit, resulting from cable translation in bends when load direction and sign changes (alternate tension and compression).

A reduction in backlash or lost motion is achieved by the subject device by reducing the factor of average load P. To this end, vibrating units 28 and 30 are variously connected to conduit 18 at or proximate bends 24 and 26. The vibrators, per se, constitute no part of the present invention and may be of any well known inexpensive type. For instance, a door bell type vibrator has been successfully utilized for present purposes. Two illustrative forms of vibrators are shown in FIGURES 5 and 6 and will be subsequently described.

While in the preferred form of the invention the vibrators are electrically energized, they may also be pneumatically or liquidly excited.

For maximum effectiveness, the vibrators should be placed in such a position, and in such a relation to the conduit mass and flexibility, as to induce a resonant or near resonant vibrator response at each bend of the conduit. It is, therefore, highly important where the vibrator is placed in order that such vibration be induced in the bend area even though the vibrator need not necessarily be placed at the bend. However, inasmuch as disposing the vibrator at the bend insures maximum effectiveness of the device, it has been illustrated in this position in the drawings.

As shown in FIGURES 1 through 4, vibrator 30 may be secured by a single bracket 32 to conduit 18, as shown in FIGURES 1 and 5. In another form, vibrator 28 may be secured to the conduit at two positions on the conduit through brackets 34 and 36. This latter multiple bracket arrangement permits a common vibrator to be connected so as to induce vibration in several fairly closely disposed conduit bends, infra.

A dual run system is shown in FIGURE 2 in which a common input lever 38 is operatively connected to the cable elements of two conduit assemblies 40 and 42. Similarly the cable elements are drivingly connected to an output member 44. In this instance, a pair of vibrators 28 are connected across the bends of the respective conduit assemblies 40 and 42.

A slight modification of the FIGURE 2 arrangement is shown in FIGURE 3. In this case, a single vibrator 28 is connected at one end through bracket 34 to conduit assembly 40 and at the other end connected to conduit assembly 42 through bracket 36.

Referring now to the specific form of vibrator shown in FIGURE 6, this vibrator 46 may be characterized as a vibrating beam type in which a U-shaped beam or member 48 includes an armature 50 fixed thereto and which armature extends within a coil 52. In this case, energization of coil 52 causes beam 48 to vibrate and which vibration is transmitted through a bracket 54 to conduit 56 to induce the resonant condition desired.

In FIGURE 7, a slightly different variation is provided in which a vibrator 58 includes a stationary laminated core member 60. Core 60 contains a coil 62 which centrally receives an armature portion 64 of a vibrating mass 66. Vibrating mass 66 is normally urged by springs 68 upwardly against a ring stop member 70. Here again, energization of coil 62 induces vibration in mass 66 which is transmitted to the associated conduit 72 through bracket 74.

It is apparent that various structural modifications may be made in the subject friction reducing device within the intended scope of the invention as set forth in the hereinafter appended claims.

We claim:

1. A friction reducing device for a remote control system including a conduit, a flexible cable member movably supported within said conduit, an input member secured to one end of said cable, an output member secured to the other end of said cable, said conduit and cable being so related that cable actuation urges the cable into high frictional engagement with the conduit along at least a portion of its length, and means for inducing a resonant vibration into said conduit in the vicinity of said high frictional engagement.

2. A friction reducing device for a remote control system comprising a conduit including a non-linear portion, a flexible control member disposed within said conduit and projecting from both ends thereof, an input member secured to one end of said flexible cable, an output member secured to the other end of said cable, and vibration means, said vibration means being operatively connected to the non-linear portion of said conduit to induce a vibration therein to reduce the frictional resistance between said cable and said conduit.

3. A friction reducing device for a remote control system as set forth in claim 2 in which said vibration means includes a bracket rigidly securing said means to the non-linear portion of said conduit.

4. A friction reducing device for a remote control system as set forth in claim 2 in which said vibration means includes bracket means for securing said vibration means to a plurality of points along the non-linear portion of the conduit.

5. A friction reducing device for a remote control system as set forth in claim 4 in which the vibration means includes an elongated body portion, said bracket means including a pair of bracket members articulated proximate the respective ends of said body portion.

6. A friction reducing device for a remote control system comprising a conduit, said conduit being bent to provide at least one arcuate section interconnecting generally linear conduit sections, a flexible control member movably supported within said conduit and including ends projecting from both ends of said conduit, an input member secured to one end of said control member, an output member secured to the other end of said control member, and a mechanism adapted to be operatively connected proximate the arcuate portion of said conduit to induce a resonant vibration therein to reduce the frictional resistance between said control member and said conduit.

7. A friction reducing device for a remote control system comprising a pair of conduits, each conduit being bent to provide at least one arcuate section interconnecting generally linear conduit sections, a flexible control member movably supported within each conduit and including ends projecting from both ends of said conduit to connect with input and output members, and a common vibrating mechanism adapted to be operatively connected to the arcuate portion of each conduit to induce a vibration therein to reduce the frictional resistance between each control member and its associated conduit.

References Cited in the file of this patent

UNITED STATES PATENTS

| | | |
|---|---|---|
| 2,099,443 | Kraft | Nov. 16, 1937 |
| 2,496,291 | High | Feb. 7, 1950 |
| 2,926,001 | Mack et al. | Feb. 23, 1960 |
| 2,971,396 | Cronquist | Feb. 14, 1961 |
| 2,983,776 | Wheatley | May 9, 1961 |
| 3,008,336 | Leduc | Nov. 14, 1961 |
| 3,059,663 | Whitenack | Oct. 23, 1962 |